United States Patent [19]

Neumann et al.

[11] Patent Number: 5,162,423
[45] Date of Patent: Nov. 10, 1992

[54] THERMOPLASTIC MOLDING MATERIALS HAVING GOOD LOW-TEMPERATURE IMPACT STRENGTH

[75] Inventors: Rainer Neumann, Mutterstadt; Ehrenfried Baumgartner, Roedersheim-Gronau; Klaus Benker, Neustadt; Karl Ruppmich, Ludwigshafen, all of Fed. Rep. of Germany

[73] Assignee: BASF Aktiengesellschaft, Ludwigshafen, Fed. Rep. of Germany

[21] Appl. No.: 613,014

[22] Filed: Nov. 15, 1990

[30] Foreign Application Priority Data

Nov. 25, 1989 [DE] Fed. Rep. of Germany ....... 3939046

[51] Int. Cl.$^5$ ...................... C08L 69/00; C08L 25/12
[52] U.S. Cl. ...................... 524/504; 525/67; 525/71; 525/133
[58] Field of Search .................. 525/67, 71, 133; 524/504

[56] References Cited

U.S. PATENT DOCUMENTS

| 3,655,824 | 4/1972 | Kato | 260/873 |
| 3,891,719 | 6/1975 | Shirmer | 525/67 |
| 4,461,868 | 7/1984 | Lindner | 525/67 |
| 4,634,734 | 1/1987 | Hambrecht | 525/85 |
| 4,868,235 | 9/1989 | Muehlbach | 525/67 |
| 4,880,875 | 11/1989 | Wassmuth | 525/67 |
| 5,008,330 | 4/1991 | Laughner | 525/67 |
| 5,068,285 | 11/1991 | Laughner | 525/67 |

FOREIGN PATENT DOCUMENTS 2901576 7/1980 Fed. Rep. of Germany .
3521407 1/1987 Fed. Rep. of Germany .

Primary Examiner—James J. Seidleck
Assistant Examiner—David Buttner
Attorney, Agent, or Firm—Oblon, Spivak, McClelland, Maier & Neustadt

[57] ABSTRACT

Thermoplastic material comprising:
A) 20-80% polycarbonate
B) 10-60% styrenic/nitrile copolymer
C) 5-30% ABS or MBS with a median particle size of 0.2-0.5 microns
D) 20-60% ASA with a median particle size of 0.4-0.7 microns.

4 Claims, No Drawings

THERMOPLASTIC MOLDING MATERIALS HAVING GOOD LOW-TEMPERATURE IMPACT STRENGTH

The present invention relates to thermoplastic molding materials, i.e. blends of polycarbonate and three or more further polymers:

a styrene/acrylonitrile (co)polymer having an AN content of less than 30%,
an agglomerated polybutadiene graft rubber having an S/AN or S-MMA shell and
a coarse-particled acrylate graft rubber.

Such blends of a plurality of different polymers are disclosed in, for example,
(1) DE-A-3 521 407
(2) DE-A-3 735 754
(3) EP-A-244 856
(4) DE-A-2 901 576

The following publications are also relevant:
(5) DE-A-2 037 419
(6) DE-A-2 259 564
(7) DE-A-3 210 284

(1) describes blends of polycarbonate (PC), 2 graft copolymers and copolymers forming a hard matrix, where the graft copolymers may be produced by mass or emulsion polymerization and have mean particle diameters of from 0.09 to 5 μm but exhibit different degrees of grafting.

(2) describes molding materials of PC and acrylonitrile/butadiene/styrene polymers (ABS), a blend of finely divided (from 0.05 to 0.5 μm) emulsion polymers and coarse-particled (from 0.8 to 5 μm) solution polymers being used.

Finally, (3) describes the use of two graft rubbers having a mean particle size of from 50 to 100 nm and from 200 to 700 nm in blends of polycarbonate and styrene/acrylonitrile copolymers (SAN).

The PC-free blends which are described in (4) and have good impact strength at low temperatures consist of a polybutadiene graft rubber having a mean particle size of from 0.2 to 0.45 μm and an acrylate rubber having a mean particle size of from 0.05 to 0.15 μm.

PC/ABS blends have long been known (German Patents 1,170,141 and 1,810,993). They generally have good impact strength at low temperatures but unsatisfactory weather stability and resistance to yellowing.

Improved weather stability is achieved in the case of PC/ASA blends, as described in, for example, (5), (6) and (7). However, their poor low-temperature impact strength owing to the high glass transition temperature of the acrylate rubber is a disadvantage.

It is an object of the present invention to provide molding materials of polycarbonate and toughened styrene/acrylonitrile polymers, which molding materials have excellent low-temperature notched impact strength as well as good weather stability and resistance to yellowing.

We have found that this object is achieved by a molding material which essentially contains (based on the sum of $A+B+C+D$)

A: from 20 to 80% by weight of a polycarbonate A,
B: from 10 to 60% by weight of a thermoplastic copolymer B of (based in each case on B)
 $b_1$: from 70 to 90% by weight of polymerized units $b_1$ of styrene, of α-methylstyrene or of a styrene alkylated in the nucleus and
 $b_2$: from 10 to 30% by weight of polymerized units $b_2$ of (meth)acrylonitrile,
C: from 5 to 30% by weight of a graft copolymer C of (based in each case on C)
 $c_1$: from 20 to 60% by weight of a polybutadiene rubber $c_1$ and
 $c_2$: from 80 to 40% by weight of a shell $c_2$ which is grafted thereon and consists of (based in each case on $c_2$) either
 $c_{21}$: from 70 to 90% by weight of polymerized units $c_{21}$ of styrene and
 $c_{22}$: from 10 to 30% by weight of polymerized units $c_{22}$ of (meth)acrylonitrile or
 $c_{23}$: from 15 to 40% by weight of polymerized units $c_{23}$ of styrene,
 $c_{24}$: from 85 to 60% by weight of polymerized units $c_{24}$ methyl methacrylate and
 $c_{25}$: not more than 3% by weight of polymerized units $c_{25}$ of glycidyl methacrylate, and
D: from 5 to 30% by weight of a graft copolymer D of (based in each case on D)
 $d_1$: from 20 to 60% by weight of a crosslinked acrylate rubber $d_1$ and
 $d_2$: from 80 to 40% by weight of a shell $d_2$ which is grafted thereon and consists of (based in each case on $d_2$)
 $d_{21}$: from 70 to 90% by weight of styrene $d_{21}$ and
 $d_{22}$: from 10 to 30% by weight of (meth)acrylonitrile $d_{22}$, with the proviso that the graft copolymer C has a median particle diameter of from 0.2 to 0.5 μm and the graft copolymer D has a median particle diameter of from 0.4 to 0.7 μm, determined in each case as the $d_{50}$ value of the integral mass distribution.

Polycarbonate A

The polycarbonates (component A) used may be the known polycarbonates. For the purposes of the present invention, polycarbonates A are polycarbonates based on homopolycarbonates and copolycarbonates of bisphenols. Examples of suitable bisphenols are dihydroxybiphenyls, bis-(hydroxyphenyl)-alkanes and bis-(hydroxyphenyl) ethers. However, all other bisphenols which are suitable for the preparation of polycarbonates may also be used, as described in, inter alia, the monograph by H. Schnell, Chemistry and Physics of Polycarbonates, Interscience.Publishers, New York, 1964, and in U.S. Pat. No. 2,999,835 and DE-A 22 48 817. Polycarbonates based on 2,2-bis-(4-hydroxyphenyl)-propane (bisphenol A) are particularly preferred. The synthesis of the polycarbonates is described in, for example, U.S. Pat. No. 2,999,835 and British Patent 772,627.

The best polycarbonates A generally have a mean molecular weight $M_w$ of from 25,000 to 200,000, determined by light scattering.

The molding material contains from 20 to 80, preferably from 40 to 80, % by weight, based on the sum of A to D, of component A.

Copolymers B

Styrene/(meth)acrylonitrile copolymers are used. These essentially consist of from 70 to 90% by weight of styrene polymers (b) and from 10 to 30% by weight of (meth)acrylonitrile.

If the (meth)acrylonitrile content is outside the preferred range, molding materials having unsatisfactory toughness are obtained.

A preferably used styrene polymer is styrene. In order to improve the heat distortion resistance, the styrene may be completely or partly replaced by α-methylstyrene or styrene alkylated in the nucleus, in particular p-methylstyrene. The particularly preferably used styrene/acrylonitrile copolymers are commercially available and can be prepared, for example, according to German Published Application DAS 1,010,001 or German Patent 1,003,436. The molecular weight range of the copolymers may be, for example, from 80,000 to 500,000 (weight average molecular weight from light scattering).

The molding material consists of from 10 to 60, preferably from 10 to 50, % by weight, based on the sum of A–D, of component B.

Graft Copolymer C

These graft copolymers are composed of from 20 to 60% by weight of a polybutadiene rubber $c_1$ as an elastomer component and from 80 to 40% by weight of a shell $c_2$ grafted thereon, the percentages in each case being based on C. Suitable rubbers are polybutadiene (cf. DE-A-14 20 775 and DE-A-14 95 089) and copolymers of polybutadiene and styrene (cf. British Patent 649,166). The rubber $c_1$ should have a glass transition temperature (according to K. H. Illers and H. Breuer, Kolloid-Z. 167 (1961), 110) which is less than $-40°$ C., preferably less than $-60°$ C.

The graft shell $c_2$ is composed either of from 70 to 90% by weight of styrene, α-methylstyrene or a styrene alkylated in the nucleus ($c_{21}$) and from 10 to 30% by weight of (meth)acrylonitrile ($c_{22}$) or of from 15 to 40% by weight of styrene ($c_{23}$) and from 85 to 60% by weight of methyl methacrylate ($c_{24}$) and, if desired, not more than 3% by weight of glycidyl methacrylate ($c_{25}$), the percentages in each case being based on $c_2$. Thus, the graft copolymers C may alternatively be composed of c, $c_{21}$ and $c_{22}$ or of $c_1$, $c_{23}$ and $c_{24}$ and possibly $c_{25}$; blends of these graft copolymers may of course also be used.

The graft copolymer C is present in the molding materials in an amount of from 5 to 30, preferably from 5 to 20, % by weight.

The graft copolymerization can be carried out in a known manner in solution, suspension or, preferably, emulsion. In the preferred preparation of the rubber and for grafting in emulsion, the soft phase of the graft copolymer has a median particle diameter ($d_{50}$ value of the integral mass distribution) of 0.08 μm. By increasing the particle size, for example by agglomeration or when the emulsion is obtained by the seed latex process, the $d_{50}$ value is brought to 0.2–0.5 μm. In such graft copolymerizations, partial or complete chemical bonding of the polymerizing monomers with the already polymerized rubber takes place, bonding probably occurring at the double bonds present in the rubber. Some or all of the monomers is thus grafted onto the rubber, i.e. bonded to the rubber filament molecules by covalent bonds.

Grafting can also be carried out by a multistage process by first grafting some of the monomers forming the graft shell and then grafting the remainder.

The type of process is not critical, provided that the composition of the graft monomers remain within the stated limits and the particle diameters of the graft copolymers are from 0.200 to 0.5 μm, preferably from 0.2 to 0.4 μm.

Graft Copolymer D

These graft copolymers are composed of (based in each case on D) a crosslinked acrylate rubber $d_1$ as an elastomer component, which is obtained by polymerizing a monomer mixture of, based on $d_1$, from 70 to 99.9% by weight of one or more alkyl acrylates where the alkyl radical is of 1 to 8 carbon atoms, from 0 to 30% by weight of one or more copolymerizable, monoethylenically unsaturated monomers and from 0.1 to 5% by weight of a copolymerizable, polyfunctional crosslinking monomer, and a shell $d_2$ grafted thereon.

The elastomer component accounts for from 20 to 60% by weight of the graft copolymer, and the graft shell from 80 to 40% by weight. The preparation of the graft copolymer can be carried out, for example, by the method described in German Patent 1,260,135. The graft shell $d_2$ is composed of from 70 to 90% by weight of styrene $d_{21}$ and from 10 to 30% by weight of (meth)acrylonitrile $d_{22}$, the percentages being based on $c_2$.

The graft copolymer D is present in the molding materials in an amount of from 5 to 30, preferably from 5 to 20, % by weight.

The graft shell may be synthesized in one or two stages, the latter being preferred. In the case of one-stage synthesis, a mixture of the monomers $d_{21}$ and $d_{22}$ in the desired weight ratio of from 70:30 to 90:10 is polymerized in a known manner (cf. German Laid-Open Application DOS 2,826,925), preferably in emulsion, in the presence of the elastomer $d_1$.

In the case of two-stage synthesis of the graft shell $d_2$, the first stage accounts for from 20 to 70, preferably from 25 to 50, % by weight, based on $d_2$. Only styrene is used for its preparation.

The second stage of the graft shell accounts for from 30 to 80, in particular from 50 to 75, % by weight, based on $d_2$. Mixtures of styrene and (meth)acrylonitrile are used for its preparation. The polymerization conditions should be chosen so that the particle size of the ASA polymer is from 0.4 to 0.7 μm, preferably from 0.4 to 0.6 μm. A seed latex process is preferably used.

Additives and Assistants E

The thermoplastic molding material may furthermore contain conventional additives in amounts of, for example, from 0.1 to 40 parts by weight per 100 parts by weight of A+B+C+D. These are, for example, fillers, dyes, pigments, antistatic agents, UV stabilizers or heat stabilizers, reinforcing agents, such as glass fibers, antioxidants, flameproofing agents and synergistic agents thereof, and in particular lubricants. Other additives conventionally used for SAN polymers and graft copolymers or polycarbonates may be present.

Particular examples of lubricants are the Pluriol ® brands based on ethylene oxide and propylene oxide. Flameproofing agents which may be used are, in particular, the agents stated in DE-A-34 36 815, poly(tetrabromobisphenol A glycidyl ether) having a molecular weight of 40,000 being particularly preferred (product F 2400 from Makteshim).

Preparation of the Molding Materials

The components are mixed in a conventional manner. However, mixing is preferably carried out by extruding, kneading or roll-milling the components together, the latter, if necessary, having been isolated beforehand from their solution or aqueous dispersion. The products of the graft copolymerization which are present in aqueous dispersion can, however, also be partially dewatered or mixed directly as a dispersion with B and then with A and, if required, with E, complete drying not being effected until the mixing process.

A particularly homogeneous solution of the soft phase in the hard matrix is preferably obtained by first thoroughly mixing a melt of the hard polymer B with the graft copolymers at above 200° C.

For this purpose, the precipitated graft copolymers C+D, which have a residual water content of from 10 to 40% by weight, are introduced at above 180° C. and mixed thoroughly, for example in an extruder with devolatilization under reduced pressure.

The granules thus obtained are then mixed with the polycarbonate and homogenized in a second extruding step at above 220° C.

The novel molding material can be processed by the known methods for thermoplastics processing, for example by extrusion, injection molding, calendering, blow molding, pressing and sintering; the molding materials prepared by the novel process are particularly preferably converted into moldings by injection molding for automotive construction.

The parameters used below can be determined as follows:

1. The median particle size and the particle size distribution are determined from the integral mass distribution. The median particle sizes are in all cases the weight average of the particle sizes as determined by means of an analytical ultracentrifuge by the method of W. Scholtan and H. Lange, Kolloid Z. und Z. Polymere 250 (1972), 782-790. The ultracentrifuge measurement gives the integral mass distribution of the particle diameter of a sample. From this it is possible to find the percentage by weight of the particles which has a diameter below a certain magnitude. The median particle diameter, which is also referred to as the $d_{50}$ value of the integral mass distribution, is defined as the particle diameter at which 50% by weight of the particles have smaller diameters than the diameter corresponding to the $d_{50}$ value. 50% by weight of the particles then likewise have a larger diameter than the $d_{50}$ value.

2. The notched impact strength $a_K$ in [kJ/m$^2$] of the samples is measured according to DIN 53,453 at −20° C. and −40° C., using standard small bars injection molded at 260° C.

3. The weather stability and resistance to yellowing are determined using circular disks injection molded at 260° C. For this purpose, the circular disks are stored in a drying oven at 110° C., and the penetration energy $W_{tot}$ is determined at room temperature after 90 hours, using 5 test specimens, according to DIN 53,453. The yellowing is assessed visually.

a.) The viscosity number (VN) of the polycarbonate used is measured in a 0.5% strength solution in methylene chloride.

b.) The VN of the styrene/acrylonitrile copolymers is measured in a 0.5% strength solution in dimethylformamide.

In the Examples below, the following raw materials were provided:

Component A

A polycarbonate available under the trade name Lexan ®, based on bisphenol A and having a viscosity number of 61.5 ml/g.

Component B1

A styrene/acrylonitrile copolymer prepared by solution polymerization and having an acrylonitrile content of 19% by weight and a VN of 70 ml/g.

Component B2

A styrene/acrylonitrile copolymer prepared by solution polymerization and having an acrylonitrile content of 35% by weight and a VN of 80 ml/g.

Component C1

A polybutadiene latex (C') which has a median particle size of 0.1 μm after a conversion of 98% is prepared by polymerizing 62 parts by weight of butadiene in the presence of a solution of 0.6 part by weight of tert-dodecyl mercaptan, 0.7 part by weight of a sodium alkylsulfonate as an emulsifier, 0.2 part by weight of potassium peroxodisulfate and 0.2 part by weight of sodium pyrophosphate in 80 parts of water at 25° C.

After the addition of 40 parts by weight of water, 0.4 part by weight of a sodium alkylsulfonate, 0.25 part by weight of potassium peroxodisulfate and 0.4 part by weight of sodium bicarbonate, 38 parts by weight of a mixture of styrene and acrylonitrile in a ratio of 75:25 are added in the course of 4 hours. Polymerization is carried out at 75° C. while stirring. The conversion, based on styrene and acrylonitrile, is finally virtually quantitative. The resulting graft rubber dispersion is precipitated with calcium chloride solution, and the graft copolymer isolated is washed with distilled water. The median particle size is 0.11 μm.

Component C2

The finely divided polybutadiene latex C' is agglomerated by adding 25 parts by weight of a 10% strength aqueous emulsion of a copolymer of 96 parts by weight of ethyl acrylate and 4 parts by weight of methacrylamide.

In the same way as in the preparation of C1, the resulting latex is grafted with styrene and acrylonitrile in a ratio of 75:25 and the product is precipitated. The median particle size is 0.36 μm.

Component C3

An agglomerated polybutadiene latex is first prepared, as described above. After the addition of 40 parts by weight of water, 0.9 part by weight of a sodium alkylsulfonate, 0.4 part by weight of sodium bicarbonate and 0.3 part by weight of potassium peroxodisulfate, 13 parts by weight of styrene are metered in at from 70 to 75° C. in the course of 1 hour. After the end of the feed, 35 parts by weight of a mixture of methyl methacrylate and glycidyl methacrylate in a weight ratio of 99:1 are metered in over 6 hours. After the end of the feed, the mixture is allowed to react for a further 3 hours and the product is then precipitated. The resulting latex has a median particle diameter of 0.37 μm.

Component C4

Polybutadiene is dissolved in a mixture of styrene and acrylonitrile in a weight ratio of 75:25 and ethylbenzene. The mixture is polymerized with vigorous stirring in a continuous process in three reactors arranged in series and having an increasing temperature profile. During the polymerization, some of the styrene/acrylonitrile mixture polymerizes onto the polybutadiene and forms the graft polymer C4 while the remainder forms the hard matrix. The polymerization product is devolatilized, extruded and then granulated.

The following analytical data were found: 9.3% of polybutadiene, 68% of styrene and 22.7% of acrylonitrile. The grafting yield is 8.3%.

The median diameter determined by counting the particles in the electron micrograph is 1.4 μm. The product thus contains 17% of coarse-particled graft rubber and 83% of SAN copolymer having a VN of 84 ml/g.

Finely Divided Graft Copolymer D1

($d_1$) 16 parts of butyl acrylate and 0.4 part of tricyclodecenyl acrylate in 150 parts of water are heated to 60° C., while stirring with the addition of one part of the sodium salt of a $C_{12}$–$C_{18}$-paraffinsulfonic acid, 0.3 part of potassium persulfate, 0.3 part of sodium bicarbonate and 0.15 part of sodium pyrophosphate. 10 minutes after the polymerization reaction begins, a mixture of 82 parts of butyl acrylate and 1.6 parts of tricyclodecenyl acrylate is added in the course of 3 hours. After the end of the addition of monomers, the reaction is allowed to continue for a further hour. The resulting latex of the crosslinked butyl acrylate polymer has a solids content of 40% by weight. The median particle size (weight average) is determined as 0.076 μm. The particle size distribution is narrow (quotient Q=0.29).

($d_2$) 150 parts of the polybutyl acrylate latex obtained according to ($d_1$) are mixed with 40 parts of a mixture of styrene and acrylonitrile (weight ratio 75:25) and 60 parts of water and heated for 4 hours at 65° C., while stirring, after the addition of a further 0.03 part of potassium persulfate and 0.05 part of lauroyl peroxide. After the end of the graft copolymerization, the polymerization product is precipitated from the dispersion by means of calcium chloride solution at 95° C., washed with water and dried in a warm stream of air. The degree of grafting of the graft copolymer is 35% and the particle size is 0.09 μm.

Coarse-particled Graft Copolymer D2

($c_1$) A mixture of 49 parts of butyl acrylate and 1 part of tricyclodecenyl acrylate on the one hand and a solution of 0.5 part of the sodium salt of a $C_{12}$–$C_{18}$-paraffinsulfonic acid in 25 parts of water on the other hand are run, at 60° C., into 1.5 parts of the latex prepared in stage ($a_1$) of this Example, in the course of 3 hours, after the addition of 50 parts of water and 0.1 part of potassium persulfate, and polymerization is continued for 2 hours. The resulting latex of the crosslinked butyl acrylate polymer has a solids content of 40%. The median particle size (weight average of the latex) is determined at 0.43 μm. The particle size distribution is narrow (Q=0.1).

($c_2$) 150 parts of this latex are mixed with 20 parts of styrene and 60 parts of water and heated at 65° C. for 3 hours while stirring, after the addition of a further 0.03 part of potassium persulfate and 0.05 part of lauroyl peroxide. The dispersion obtained in this graft copolymerization is then polymerized with 20 parts of a mixture of styrene and acrylonitrile in a ratio of 75:25 for a further 4 hours. The reaction product is precipitated from the dispersion by means of calcium chloride solution at 95° C., isolated, washed with water and dried in a warm stream of air. The degree of grafting of the graft copolymer is determined as 35%; the median particle size of the latex particles is 0.5 μm.

Component E1

Loxiol ® G70 S, a high molecular weight polyfunctional fatty ester

Component E2

Stabilizer consisting of 1 part of Irganox ® PS 800 and 1 part of a sterically hindered phenol.

EXAMPLES AND COMPARATIVE EXAMPLES

The numbers of parts by weight of components A, B, C and D, stated in the Table, are additionally granulated with 0.1 part of stabilizer (component E2) and 0.5 part of Loxiol G70 S (component E1) in a commercial twin-screw extruder. The moldings for testing of the properties are produced by injection molding of the dried granules of the samples.

| | | | | | | | | | | $W_{tot}$[Nm] [kJ/m²] | | after 90 hours at | Yellowing after 90 hours |
|---|---|---|---|---|---|---|---|---|---|---|---|---|---|
| | A | B1 | B2 | C1 | C2 | C3 | C4 | D1 | D2 | −20° C. | −40° C. | 110° C. | at 110° C. |
| Example | | | | | | | | | | | | | |
| 1 | 60 | 20 | — | — | 10 | — | — | — | 10 | 34 | 27 | 54 | Slightly yellowish |
| 2 | 60 | 20 | — | — | — | 10 | — | — | 10 | 36 | 28 | 50 | Slightly yellowish |
| 3 | 55 | 25 | — | — | 10 | — | — | — | 10 | 30 | 24 | 49 | Slightly yellowish |
| 4 | 70 | 14 | — | — | — | — | 8 | — | — | 8 | 27 | 25 | 60 | Slightly yellowish |
| Comparative Example | | | | | | | | | | | | | |
| A | 60 | 20 | — | — | 10 | — | — | 10 | — | 21 | 4 | 54 | Slightly yellowish |
| B | 60 | 20 | — | — | — | 10 | — | 10 | — | 22 | 8 | 49 | Slightly yellowish |
| C | 60 | 20 | — | — | — | — | — | 10 | 10 | 9 | 3 | 54 | Slightly yellowish |
| D | 60 | — | 20 | — | — | 10 | — | — | 10 | 3 | 1 | 10 | Slightly yellowish |
| E | 60 | 20 | — | 10 | — | — | — | — | 10 | 23 | 16 | 40 | Slightly yellowish |
| F | 60 | — | — | — | — | 10 | — | 30 | — | — | 30 | 21 | 25 | Strongly yellow |
| G | 60 | 20 | — | 10 | 10 | — | — | — | — | 37 | 29 | 20 | Strongly yellow |

The comparison of Examples 1 and 2 and Comparative Experiments A and B show that, in contrast to DE 2 901 576, an advantageous combination of properties is achieved in PC blends, in particular in the low-temperature impact strength, by combining the coarse-particled acrylate rubbers and polybutadiene rubbers. This shows that information about toughened styrene copolymers cannot be directly extrapolated to mixtures of these with polycarbonate.

Acrylate rubbers (Comparative Experiment C) alone give only an unsatisfactory low-temperature impact strength.

The AN content of component B should not exceed the claimed range (Comparative Experiment D).

In Comparative Experiment E, the novel butadiene rubber is replaced by a finely divided polybutadiene rubber. The notched impact strength and penetration energy are substantially lower than in the case of the novel molding materials.

As expected, the mixtures in which only butadiene rubbers are used (Comparative Experiments F and G) exhibit substantially stronger yellowing and considerably reduced toughness after storage at elevated temperatures.

We claim:

1. A thermoplastic molding material containing (based on the sum of $A+B+C+D$)

A: from 20 to 80% by weight of a polycarbonate A,
B: from 10 to 60% by weight of a thermoplastic copolymer B of (based in each case on B)
  $b_1$: from 70 to 90% by weight of polymerized units $b_1$ of styrene, of $\alpha$-methylstyrene or of a styrene alkylated in the nucleus and
  $b_2$: from 10 to 30% by weight of polymerized units $b_2$ of (meth)acrylonitrile,
C: from 5 to 30% by weight of a graft copolymer C of (based in each case on C)
  $c_1$: from 20 to 60% by weight of a polybutadiene rubber $c_1$ and
  $c_2$: from 80 to 40% by weight of a shell $c_2$ which is grafted thereon and consists of (based in each case on $c_2$)
    $c_{21}$: from 70 to 90% by weight of polymerized units $c_{21}$ of styrene and
    $c_{22}$: from 10 to 30% by weight of polymerized units $c_{22}$ of (meth)acrylonitrile, and
D: from 5 to 30% by weight of a graft copolymer D of (based in each case on D)
  $d_1$: from 20 to 60% by weight of a crosslinked acrylate rubber $d_1$ and
  $d_2$: from 80 to 40% by weight of a shell $d_2$ which is grafted thereon and consists of (based in each case on $d_2$)
    $d_{21}$: from 70 to 90% by weight of styrene $d_{21}$ of styrene and
    $d_{22}$: from 10 to 30% by weight of polymerized units $d_{22}$ of (meth)acrylonitrile, with the proviso that the graft copolymer C has a median particle diameter of from 0.2 to 0.5 μm and the graft copolymer D has a median particle diameter of from 0.4 to 0.7 μm, determined in each case as the $d_{50}$ value of the integral mass distribution.

2. A molding material as claimed in claim 1, containing from 40 to 80% by weight of A,
from 10 to 50% by weight of B,
from 5 to 20% by weight of C and
from 5 to 20% by weight of D.

3. A molding material as claimed in claim 1, whose graft copolymer C has a $d_{50}$ value of from 0.2 to 0.4 μm and whose graft copolymer D has a $d_{50}$ value of from 0.4 to 0.6 μm.

4. A molding material as claimed in claim 1, containing from 0.1 to 40 parts by weight of conventional additives (component E) per 100 parts by weight of the mixture of $A+B+C+D$.

* * * * *